(12) United States Patent
Kehrer

(10) Patent No.: US 9,941,909 B2
(45) Date of Patent: *Apr. 10, 2018

(54) MULTIPLE INPUT AND MULTIPLE OUTPUT SWITCH NETWORKS

(71) Applicant: Infineon Technologies AG, Neubiberg (DE)

(72) Inventor: Daniel Kehrer, Sauerlach (DE)

(73) Assignee: INFINEON TECHNOLOGIES AG, Neubiberg (DE)

(*) Notice: Subject to any disclaimer, the term of this patent is extended or adjusted under 35 U.S.C. 154(b) by 0 days.

This patent is subject to a terminal disclaimer.

(21) Appl. No.: 15/241,736

(22) Filed: Aug. 19, 2016

(65) Prior Publication Data
US 2016/0359504 A1    Dec. 8, 2016

Related U.S. Application Data

(63) Continuation of application No. 14/252,322, filed on Apr. 14, 2014, now Pat. No. 9,490,852.

(51) Int. Cl.
| | |
|---|---|
| *H03K 9/00* | (2006.01) |
| *H04B 1/00* | (2006.01) |
| *H04B 1/10* | (2006.01) |
| *H04B 7/0452* | (2017.01) |

(52) U.S. Cl.
CPC .......... *H04B 1/006* (2013.01); *H04B 1/1027* (2013.01); *H04B 7/0452* (2013.01)

(58) Field of Classification Search
CPC ................. H03F 3/211; H04B 1/44
USPC ......................................... 375/316
See application file for complete search history.

(56) References Cited

U.S. PATENT DOCUMENTS

| | | |
|---|---|---|
| 5,204,836 A | 4/1993 | Reed |
| 6,094,097 A | 7/2000 | Ke |
| 8,886,141 B2 | 11/2014 | Nakane et al. |
| 9,100,060 B2 | 8/2015 | Ilkov |
| 2010/0253435 A1* | 10/2010 | Ichitsubo ............... H01L 23/16 330/295 |
| 2010/0327948 A1 | 12/2010 | Nisbet et al. |
| 2011/0250926 A1 | 10/2011 | Wietfeldt et al. |
| 2013/0043946 A1 | 2/2013 | Hadjichristos et al. |

(Continued)

FOREIGN PATENT DOCUMENTS

| | | |
|---|---|---|
| CN | 101442330 A | 5/2009 |
| CN | 103078639 A | 5/2013 |

(Continued)

*Primary Examiner* — Fabricio R Murillo Garcia
(74) *Attorney, Agent, or Firm* — Slater Matsil, LLP

(57) ABSTRACT

According to an embodiment, a circuit package includes a programmable switch component having a plurality of input terminals arranged on the programmable switch component, a plurality of output terminals arranged on the programmable switch component and configured to be coupled to a plurality of amplifiers, and a plurality of switches. Each switch of the plurality of switches is coupled between an input terminal of the plurality of input terminals and an output terminal of the plurality of output terminals. Each switch of the plurality of switches includes a radio frequency (RF) switch and is configured to pass an RF signal when closed. Each input terminal of the plurality of input terminals is coupled to two switches of the plurality of switches.

33 Claims, 8 Drawing Sheets

(56) References Cited

U.S. PATENT DOCUMENTS

| | | | |
|---|---|---|---|
| 2013/0234799 A1* | 9/2013 | Gudem | H04B 1/18 330/295 |
| 2014/0034999 A1 | 2/2014 | Korec | |
| 2014/0134959 A1 | 5/2014 | Tasic et al. | |
| 2014/0227982 A1* | 8/2014 | Granger-Jones | H04B 7/0404 455/77 |
| 2014/0302802 A1 | 10/2014 | Chang et al. | |
| 2015/0126136 A1 | 5/2015 | Robinett et al. | |

FOREIGN PATENT DOCUMENTS

| | | |
|---|---|---|
| CN | 103198950 A | 7/2013 |
| KR | 20120108019 A | 10/2012 |

\* cited by examiner

MULTIPLE INPUT AND MULTIPLE OUTPUT SWITCH NETWORKS

CROSS-REFERENCE TO RELATED APPLICATIONS

This application is a continuation of and claims the benefit of U.S. patent application Ser. No. 14/252,322, filed on Apr. 14, 2014, which application is hereby incorporated herein by reference.

TECHNICAL FIELD

The present invention relates generally to a system and method for electrical circuits, and, in particular embodiments, to a system and method for a Multiple Input and Multiple Output Switching Network.

BACKGROUND

Electronic devices used with wireless communication systems, such as cellular phones, GPS receivers, and Wi-Fi enabled notebook and tablet computers, generally contain signal processing systems that have interfaces to the analog world. Such interfaces may include wire line and wireless receivers that receive transmitted power and convert the received power to an analog or digital signal that may be demodulated using analog or digital signal processing techniques.

A typical wireless receiver architecture includes a low noise amplifier (LNA) that amplifies the very small signals that may be received by an antenna, provides gain to these small signals and passes an amplified signal to later amplification and/or signal processing stages. By providing gain at the LNA, subsequent gain processing stages are made insensitive to noise, thereby enabling a lower system noise figure.

Such a wireless receiver is often also configured to operate in multiple frequency bands. Multiple LNAs are used in such wireless systems to operate the wireless system in multiple frequency bands. An LNA circuit generally contains at least one transistor and an input matching network. The purpose of the input matching network, which may be made of one or more passive devices such as inductors and capacitors, is to provide an impedance match and/or a noise match to a previous stage, such as an antenna, a filter, an RF switch, or other circuit. LNA implementations may also include an output matching network, a bias network, and other circuit structures such as a cascode transistor.

As wireless RF devices are being used in more environments with more varied specifications, the integration of multiple LNAs to accommodate different frequency bands is especially challenging and expensive. Particularly, the placement and usage of LNAs in such varied and demanding systems present varied challenges. Among other things, challenging aspects of designing modern wireless RF devices may include reducing the effects of attenuation, decreasing sensitivity to noise, reducing cost, reducing design time and challenge, and increasing system data rates.

SUMMARY

According to an embodiment, a circuit package includes a programmable switch component having a plurality of input terminals arranged on the programmable switch component, a plurality of output terminals arranged on the programmable switch component and configured to be coupled to a plurality of amplifiers, and a plurality of switches. Each switch of the plurality of switches is coupled between an input terminal of the plurality of input terminals and an output terminal of the plurality of output terminals. Each switch of the plurality of switches includes a radio frequency (RF) switch and is configured to pass an RF signal when closed. Each input terminal of the plurality of input terminals is coupled to two switches of the plurality of switches.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of various embodiments are discussed in detail below. It should be appreciated, however, that the various embodiments described herein are applicable in a wide variety of specific contexts. The specific embodiments discussed are merely illustrative of specific ways to make and use various embodiments, and should not be construed in a limited scope.

Description is made with respect to various embodiments in a specific context, namely wireless systems, and in particular, switch networks for low noise amplifiers (LNAs) in wireless systems. Some of the various embodiments described herein include switches, pin-outs, switch networks, LNAs, input multiplexing, and wire line routing for LNA inputs. In other embodiments, aspects may also be applied to other applications involving any type of switch network according to any fashion as known in the art.

According to an embodiment, a switch network couples input lines including multiple frequency bands to an LNA bank including multiple LNAs. Embodiment mobile or wireless devices, such as cell phones, tablets, or laptops, for example, are configured to operate with multiple frequency bands. Depending on the usage environment, the specific number and configurations of the bands may vary. For example, different countries and different wireless providers may use or assign different frequency bands to various applications and usage populations. Embodiment devices are configured to receive signals in specific frequency bands and convey such signals through LNAs to processing circuits. In such embodiments, each system for use with various different frequency bands may include a printed circuit board with a particular configuration of wireless components. For example, an antenna or antennas may be coupled to an antenna switch, a filter bank, a switch network, and LNA bank, and an application processor.

According to various embodiments, antenna signals are coupled to the LNA bank through a programmable switch network. Conventionally, different configurations for different frequency bands required re-routing of signal line layouts and unique pin-outs specific to each set of different frequency bands. In embodiments described herein, programmable switch networks couple or route the antenna signals to the LNA bank without re-routing the layout of signal lines in some cases and without unique pin-outs specific to each set of different frequency bands used in the wireless system.

Figure 1:
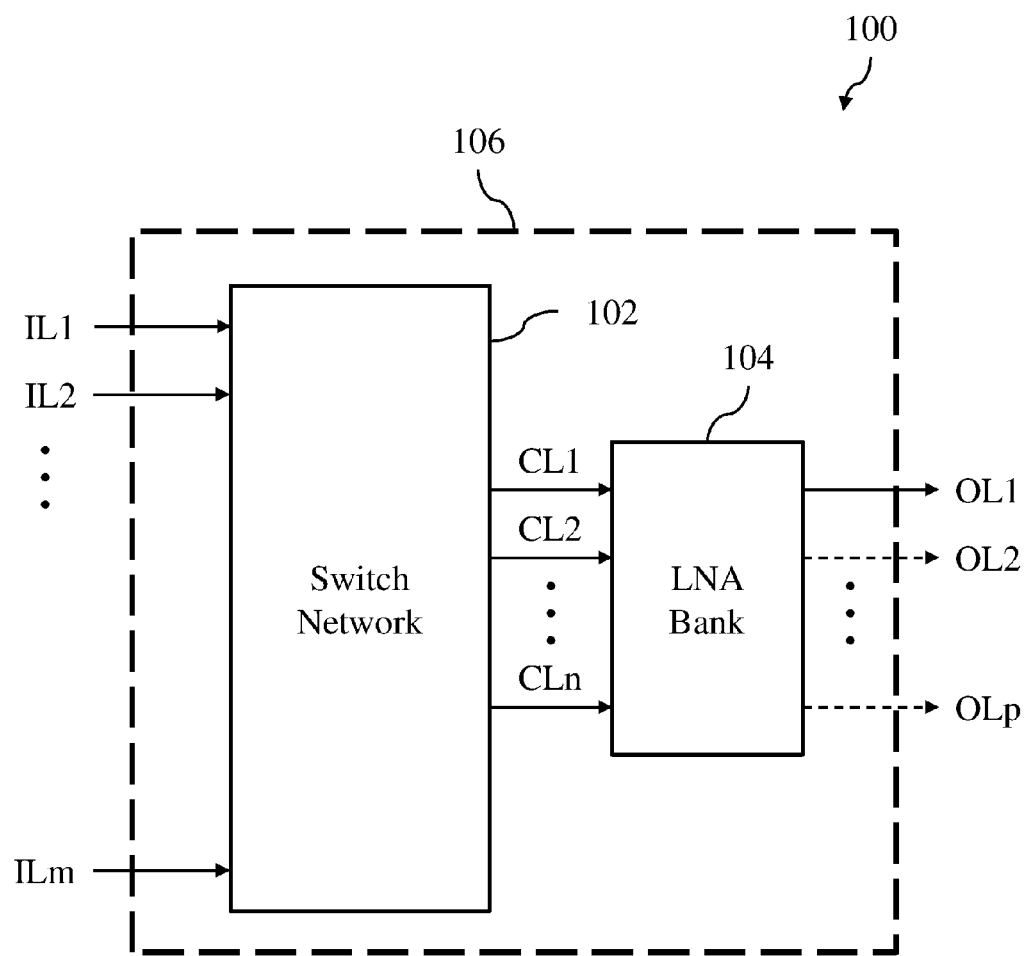
FIG. 1 illustrates a system block diagram of an embodiment system.

FIG. 1 illustrates a system block diagram of an embodiment system 100 including programmable switch network 102 and LNA bank 104 attached to circuit package 106. According to various embodiments, signals are received on input lines IL1-ILm and conveyed through programmable switch network 102 and coupling lines CL1-CLn to LNA bank 104. The signals received on input lines IL1-ILm may include signals from different frequency bands. Particularly, each frequency band may be routed through the programmable switch to a specific LNA in LNA bank 104 that is configured to receive and amplify signals within the respective frequency band. LNA bank 104 receives signals on coupling lines CL1-CLn and provides amplified output signals on output lines OL1-OLp. According to various embodiments, m, n, and p may be any numbers. In one particular embodiment, m=8, n=3, and p=3, corresponding to eight input lines, three coupling lines to three LNAs, and three output lines. In a further embodiment, p=1, corresponding to a single output line coupled to the outputs of three LNAs in LNA bank 104. These numbers are illustrative and numerous other configurations are envisioned within the scope of various embodiments, as is described below in reference to the other figures. In some embodiments, the various frequency bands supplied to the LNAs in LNA bank 104 may include frequencies between 700 MHz and 2.7 GHz. In other embodiments, frequencies up to 3.5 GHz may be used. In still further embodiments, any frequencies may be used.

In various embodiments, carrier aggregation includes using more than one of the frequency bands coupled to input lines IL1-ILm simultaneously. For example, switch network 102 may couple a subset of inputs IL1-ILm to an LNA or a plurality of LNAs in LNA bank 104. The subset of input lines may simultaneously convey signals from multiple frequency bands to a single LNA or to a plurality of LNAs in LNA bank 104. In some embodiments, the single LNA supplies a single output line driving the signals from multiple frequency bands simultaneously. In other embodiments, the plurality of LNAs may be multiplexed at an output to supply a single output line driving the signals from multiple frequency bands simultaneously. In the various embodiments, carrier aggregation is enabled through switch network 102 and LNA bank 104 driving the signals from multiple frequency bands simultaneously at an output line of the output lines OL1-OLp.

According to various embodiments, programmable switch network 102 includes coupling between each input line IL1-ILm and at least two outputs from coupling lines CL1-CLn. In a specific embodiment, programmable switch network 102 includes coupling between each input line IL1-ILm and every coupling line CL1-CLn. When programmable switch network 102 is programmed, at least some of input lines IL1-ILm are coupled to coupling lines CL1-CLn. In various embodiments, every input line of IL1-ILm is coupled to a single coupling line of CL1-CLn and to the LNA attached thereto. In such embodiments, a subset of input lines IL1-ILm including multiple input lines may be coupled to a single coupling line of CL1-CLn. The subset may be driven simultaneously for carrier aggregation or separately for each frequency band. Alternatively, some of the input lines IL1-ILm are coupled to coupling lines CL1-CLn and some of the input lines IL1-ILm are left uncoupled (i.e., unconnected) or grounded. In some alternative embodiments, input lines IL1-ILm may be coupled to multiple coupling lines of CL1-CLn and to the LNAs coupled thereto. In various embodiments, programmable switch network may provide numerous different pin-out configurations for coupling input lines IL1-ILm to LNAs in LNA bank 104 without any system redesign or reconfiguration. Specific example embodiments are discussed below in reference to the other figures that illustrate various frequency bands and LNA configurations. In various embodiments, some or all of the input lines IL1-ILm may be coupled to filters, such as surface acoustic wave (SAW) filters, for example.

Figure 2:
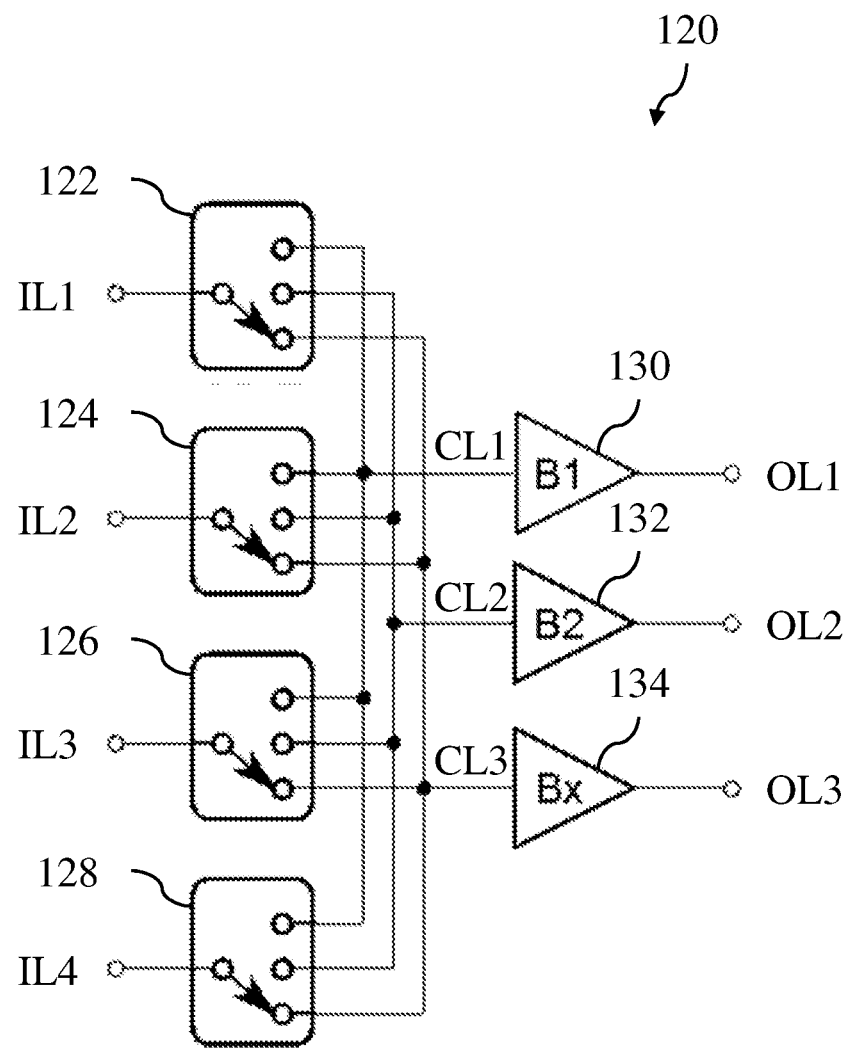
FIG. 2 illustrates a schematic of an embodiment system.

FIG. 2 illustrates a schematic of an embodiment system 120 including four single pole triple throw (SP3T) switches 122-128 coupled to LNAs 130-134. According to various embodiments, each switch 122, 124, 126, and 128 is coupled to an input line IL1, IL2, IL3, and IL4, respectively, and each switch is also coupled to each LNA 130, 132, and 134. In various embodiments, the four programmable SP3T switches 122-128 are programmed to couple each of the input lines IL1-IL4 to one of LNAs 130-134.

In some embodiments, each of the LNAs 130-134 is configured to receive, amplify, and convey signals in a specific frequency band. Particularly, LNA 130 is configured to receive signals in frequency band B1, LNA 132 is configured to receive signals in frequency band B2, and LNA 134 is configured to receive signals in frequency band B3. According to various embodiments, each LNA may have specific input matching networks or output matching networks configured to operate with the respective frequency band. Further, the output lines OL1-OL3 from LNAs 130-134 may be coupled together in some embodiments. Some embodiments may include LNAs and output matching networks as described in the co-pending U.S. patent application Ser. No. 14/227,479 entitled "System and Method for a Low Noise Amplifier" filed Mar. 27, 2014, which is incorporated herein by reference in its entirety.

According to various embodiments, there may be any number of input lines. In some embodiments, the SP3T switches may be implemented as any other type of throw switch. Further, any number of LNAs may be used in system 120. For example, four LNAs may be used with three inputs coupled to three SP4T (4 throw) switches. Further embodiment configurations are envisioned, some of which are described in reference to the other figures.

Figure 3:
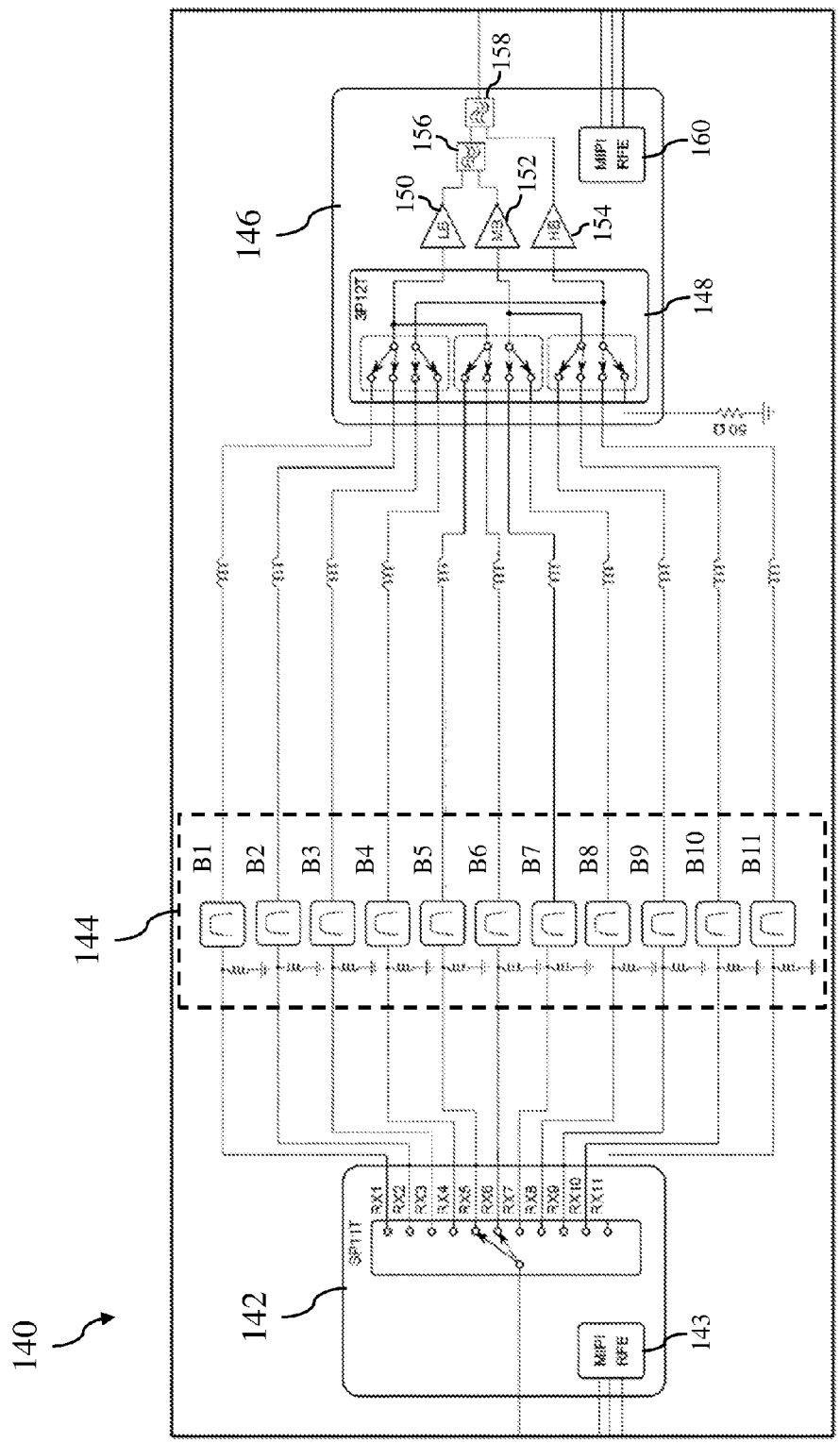
FIG. 3 illustrates a schematic of an embodiment wireless system.

FIG. 3 illustrates a schematic of an embodiment wireless system 140 including antenna switch 142, filter set 144, and LNA component 146. According to various embodiments, antenna switch 142 receives signals from an antenna and switches the antenna signals to outputs RX1-RX11. In other embodiments, antenna switch 142 may be coupled to multiple antennas and any number of outputs. A mobile industry processor interface (MIPI) module 143 may receive control signals for switching the coupling in the SP11T switch between antenna connection and outputs RX1-RX11.

In various embodiments, outputs RX1-RX11 from antenna switch 142 are coupled to filters within filter set 144. Each of the filters in filter set 144 may attenuate signals outside a specific frequency band B1-B11. Frequency bands B1-B11 may include overlapping frequency bands or non-overlapping frequency bands. Further, frequency bands B1-B11 may be additionally subdivided into sub-bands within the larger frequency bands B1-B11. In various embodiments, the filtered signals are passed through inductors to triple pole twelve throw (3P12T) switch network 148, which is coupled to LNA 150, LNA 152, and LNA 154. Each of the LNAs 150-154 may be configured to operate with a specific frequency band or range of frequency bands, such as low-band (LB), mid-band (MB), and high-band (HB), for example. MIPI module 160 may control programmable switch network 148 to control which filter and corresponding frequency bands B1-B11 are coupled to which of the LNAs 150-154. According to some embodiments, the LB, MB, and HB signals may be multiplexed using diplexers 156 and 158 at the output of LNA component 146 in order to provide a single output line. In other embodiments, each output of each LNA 150, 152, and 154 may be provided separately to individual output lines. In still further embodiments, any subset of outputs of any plurality of LNAs may be coupled together without, or with, the use of diplexers.

According to various embodiments, frequency bands B1-B11 may be highly variable depending on the intended usage environment. For example, wireless system 140 may include different frequency bands when configured to be used in different countries such as Mexico, China, Korea, Germany, or the United States of America, for example. In such different environments, filter set 144 and antenna switch 142 may be redesigned to accommodate different frequency bands or even a different number of signals and frequency bands. According to such embodiments, LNA component 146, including programmable switch network 148, may be included in the various different systems without any modification and is programmed to couple rearranged frequency bands B1-B11 to one of LNAs 150, 152, or 154. The 3P12T programmable switch network is an example embodiment and any other embodiment switch networks, such as is described herein, may also be used. In such embodiments, LNA component 146 or switch network 148 may be used in numerous different systems without redesign.

In the various embodiments, each LNA 150, 152, and 154 may be coupled to multiple frequency bands through multiple inputs, as shown. In such embodiments, carrier aggregation may be performed by supplying multiple frequency bands of frequency bands B1-B11 simultaneously to multiple inputs of programmable switch network coupled to one or more LNAs, such as LNA 150, 152, or 154. In various embodiments, the multiple frequency bands may be combined before a single LNA or at the output of multiple LNAs, depending on matching network configurations, filters, and multiplexers, for example.

According to various embodiments, wireless system 140 is attached to a printed circuit board (PCB). In such embodiments, antenna switch 142, filter set 144, and LNA component 146 are implemented as separate components attached to the PCB. Alternatively, filter set 144 may include discrete filters attached separately to the PCB. LNA component 146 may include separate components for LNAs 150, 152, and 154 and another separate component for programmable switch network 148, each component attached separately to the PCB. In the various embodiments, any components may be separately attached or grouped together into a larger component and attached to the PCB.

Figure 4:
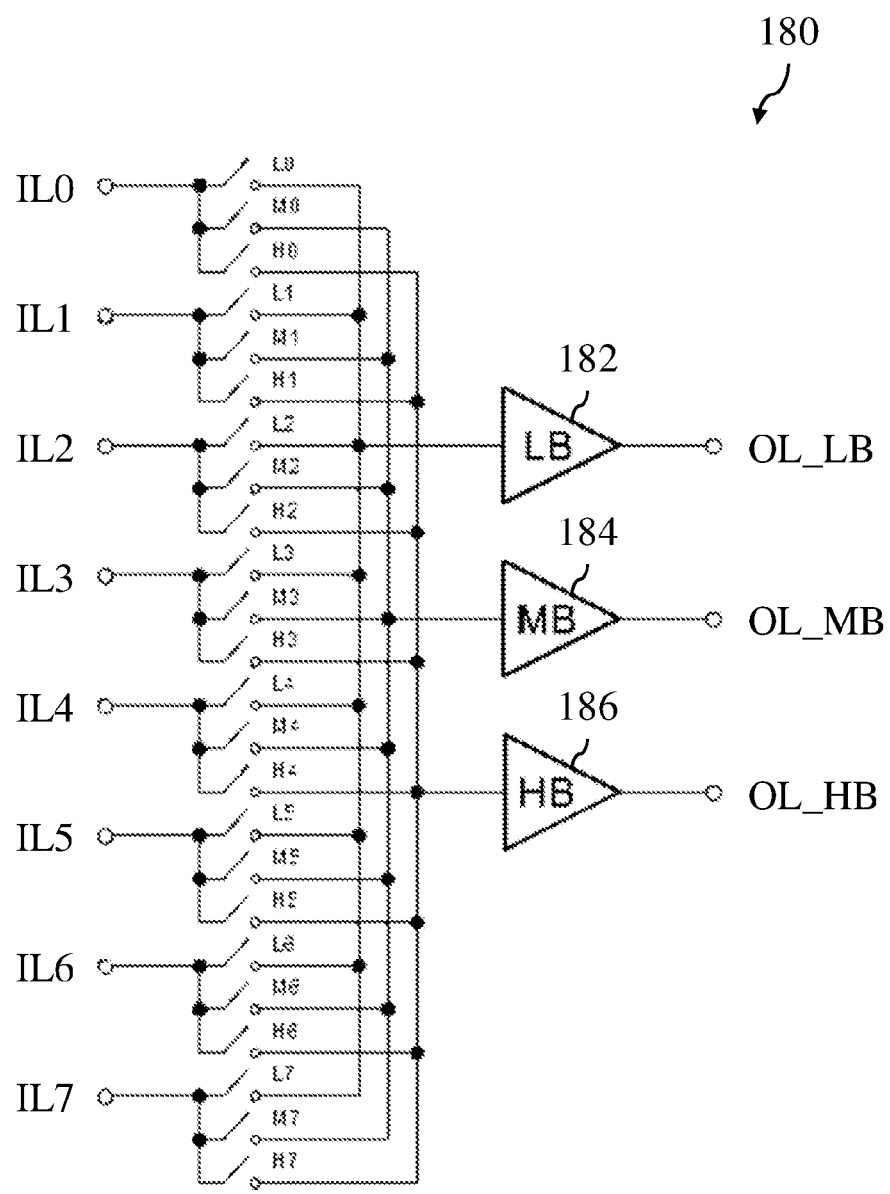
FIG. 4 illustrates a schematic of another embodiment system.

FIG. 4 illustrates a schematic of another embodiment system 180 including switches L0-H7 coupled between input lines IL0-IL7 and LNAs 182, 184, and 186. According to various embodiments, input lines IL0-IL7 receive signals in different frequency bands from an antenna switch and filters as described above in reference to the other figures. Each of the input lines IL0-IL7 is coupled to a corresponding low switch, middle switch, and high switch that are each coupled to a corresponding LNA. For example, IL1 is coupled to three switches L1, M1, and H1 that couple input line IL1 to LB LNA 182, MB LNA 184, and HB LNA 186, respectively. Specifically, low switch L1 couples input line IL1 to LB LNA 182 when closed, middle switch M1 couples input line IL1 to MB LNA 184 when closed, and high switch H1 couples input line IL1 to HB LNA 186 when closed. Similarly, the other input lines IL0 and IL2-IL7 are coupled to LNAs 182, 184, and 186 through corresponding switches. Switches L0-H7 may be implemented as CMOS transistors. In other embodiments, switches L0-H7 may be implemented as any type of physically or digitally programmable switch, such as fuses or other transistors. According to various embodiments, LB LNA 182 drives output line OL_LB, MB LNA 184 drives output line OL_MB, and HB LNA 186 drives output line OL_HB. Further, multiple input lines of input lines IL0-IL7 may be coupled to a single LNA 182, 184, or 186, for example.

Figure 5:
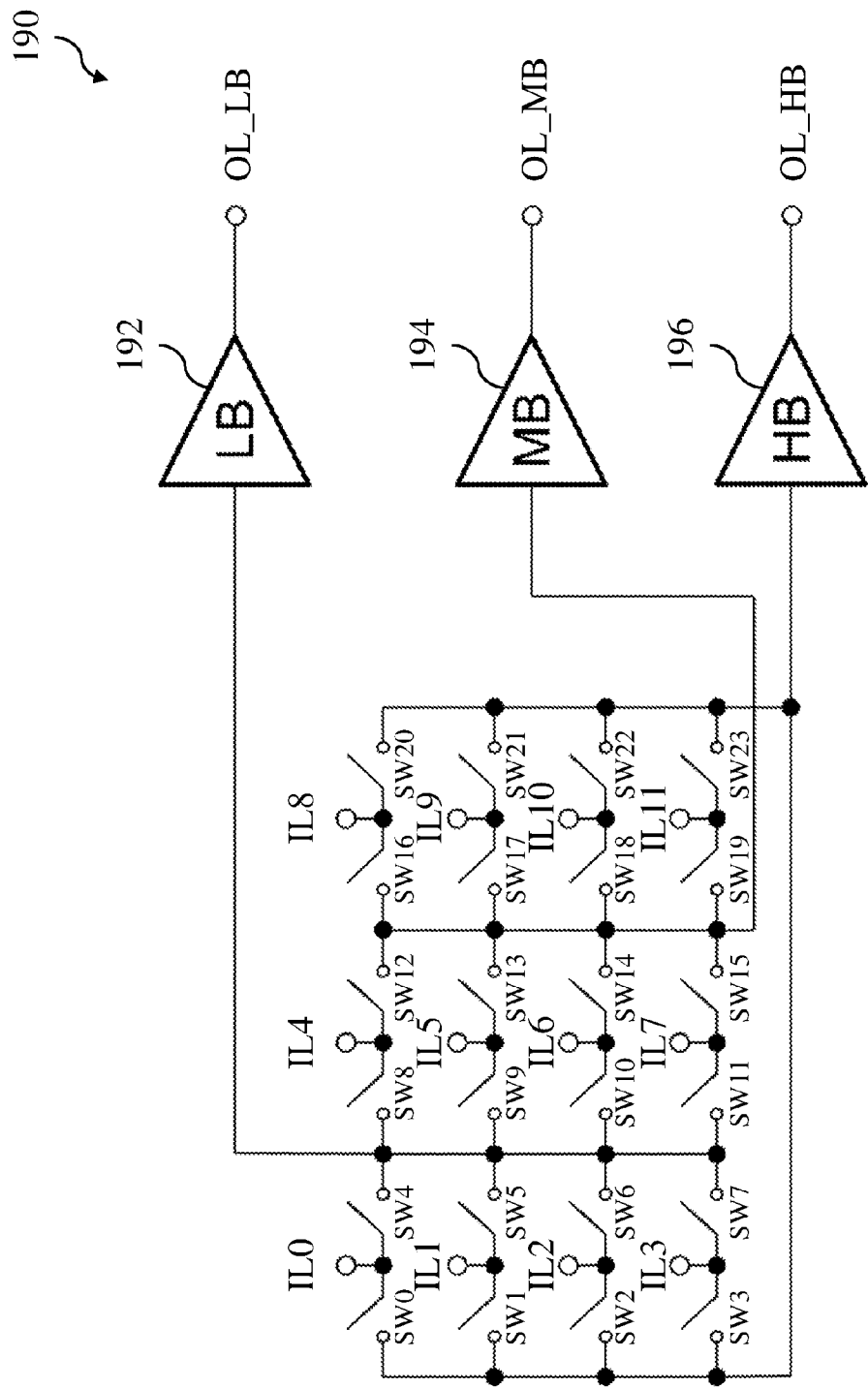
FIG. 5 illustrates a schematic of a further embodiment system.

FIG. 5 illustrates a schematic of a further embodiment system 190 including LB LNA 192, MB LNA 194, and HB LNA 196. According to various embodiments, each of the LNAs 192-196 is coupled to 8 of the 12 input lines IL0-IL11 through the 24 switches SW0-SW23. Thus, system 190 includes configurable input line coupling to specific LNAs, but not every one of the input lines IL0-IL11 may be coupled to any of the LNAs 192, 194, and 196. The number of input lines and switches coupling input lines to LNAs may vary in various embodiments. System 190 may include 8 inputs or system 180 may include 12 inputs, for example. Further, any number of LNAs may be included in such systems and each LNA may be coupled to a subset of the input lines or to every input line through specific switches.

Figure 6:
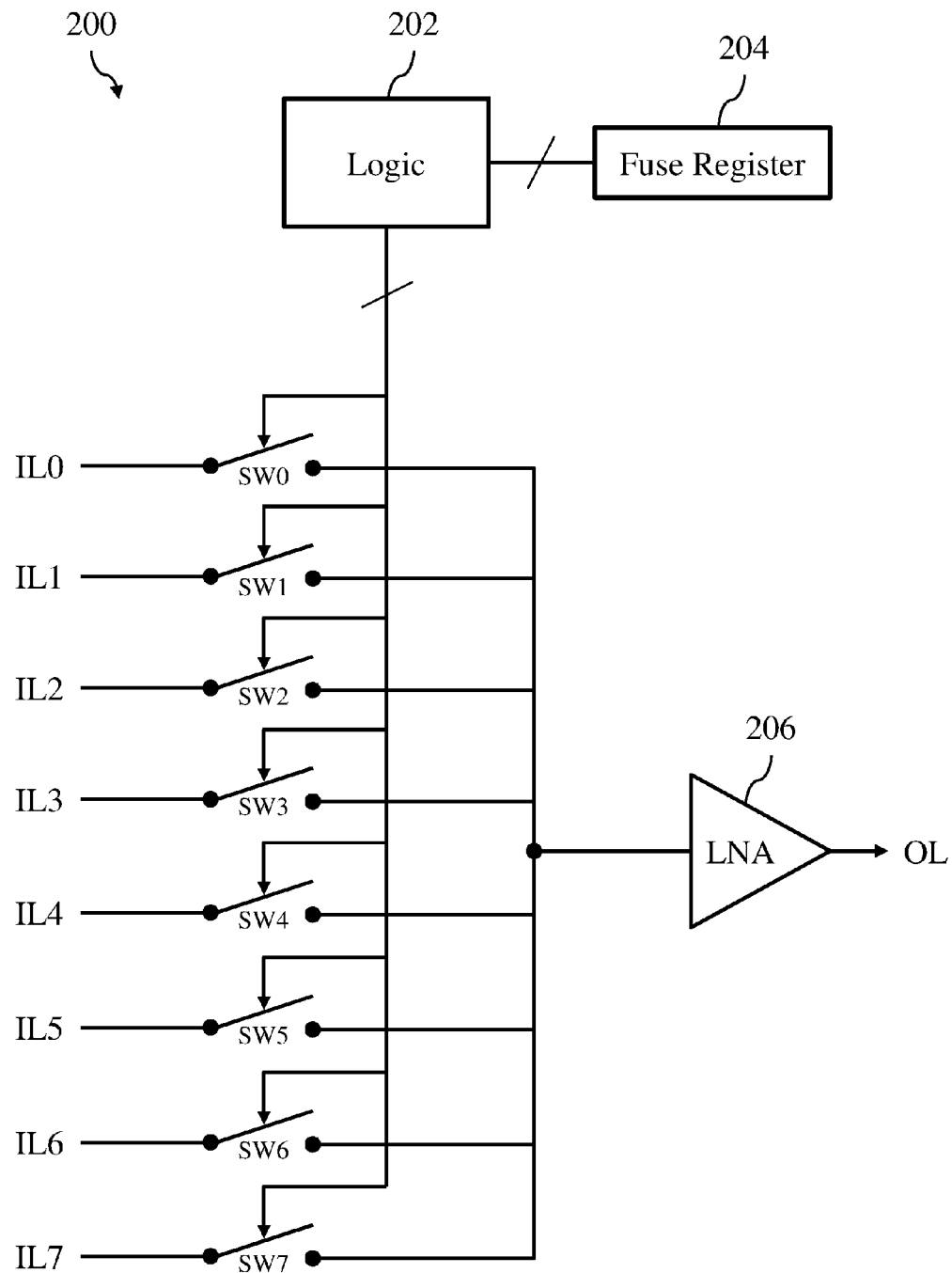
FIG. 6 illustrates a schematic of an embodiment switch system.

FIG. 6 illustrates a schematic of an embodiment switch system 200 including logic circuit 202 coupled to switches SW0-SW7 and digitally or physically programmable fuse register 204. According to various embodiments, switches couple input lines IL0-IL7 to LNA 206. Switches SW0-SW7 are controlled by logic circuit 202 in order to select which of the input lines IL0-IL7 to couple to LNA 206. Output line OL is driven by LNA 206 and logic circuit 202 receives a select signal or select input from fuse register 204.

According to various embodiments, fuse register 204 may be programmed in various ways. For example, fuse register 204 may include laser fuses that are physically melted into a non-conducting state using a laser. In other embodiments, fuse register 204 may include efuses that are electronically written to conducting and non-conducting states. In other embodiments, fuse register may include non-volatile memory blocks or registers that are digitally programmed using a MIPI or a general purpose input/output (GPIO) interface. In the various embodiments, fuse register 204 is programmed with a specific sequence to select none, some, or all of switches SW0-SW7 to be set in a conducting state, thereby coupling none, some, or all of the input lines IL0-IL7 to LNA 206.

Figure 7:
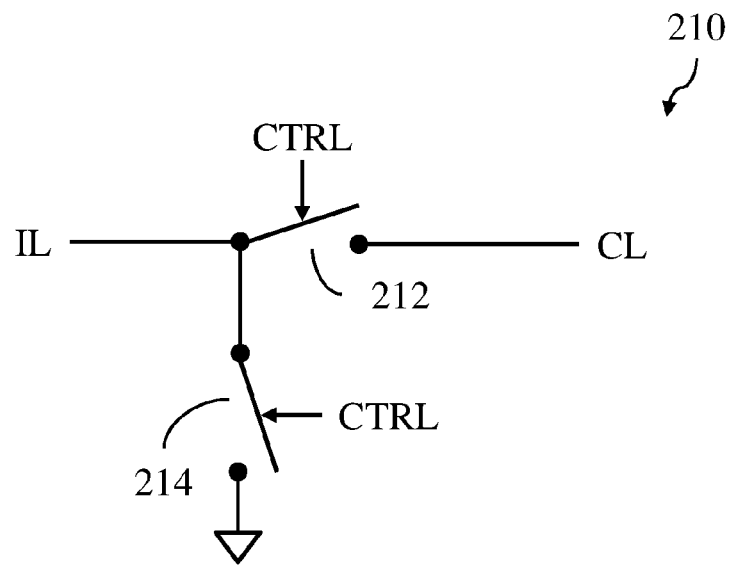
FIG. 7 illustrate s schematic of a switch circuit.

FIG. 7 illustrates schematic of a switch circuit 210 including conduction switch 212 and grounding switch 214. According to various embodiments, conduction switch 212 and grounding switch 214 are inversely controlled by control signal CTRL. When activated, conduction switch 212 is conducting in order to couple input line IL to coupling line CL, which may be coupled to an LNA (not shown), and grounding switch 214 is not conducting. When deactivated, conduction switch 212 is not conducting and grounding switch 214 is conducting in order to couple input line IL to ground. Any of the switches described herein in reference to the other figures may be implemented similar to switch circuit 210. According to various embodiments, conduction switch 212, grounding switch 214, and any other switches described herein may be implemented as any type of transistor. In a specific embodiment, conduction switch 212, grounding switch 214, and any other switches described herein are implemented as CMOS transistors.

Figure 8:
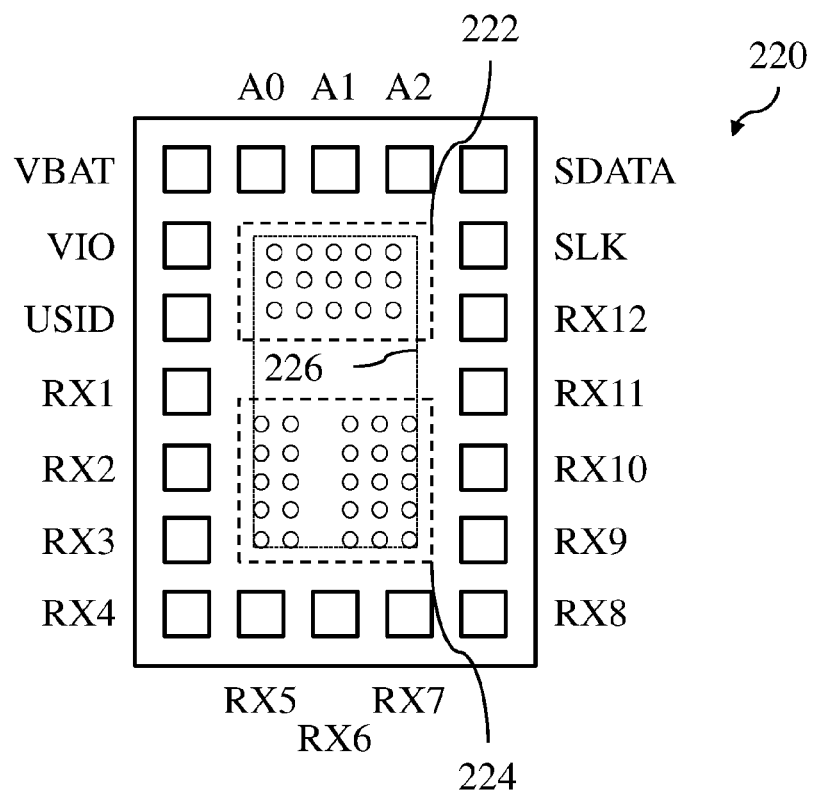
FIG. 8 illustrates a bottom view of an embodiment component.

FIG. 8 illustrates a bottom view of an embodiment component 220 with an example of 20 pins as shown. According to various embodiments, component 220 includes ball grid array (BGA) 222 and BGA 224 on a top surface. BGA 222 and BGA 224 couple a circuit die or package 226 to the top surface and route connections between specific pins and circuit die 226. According to various embodiments, circuit die 226 may include a programmable switch network or multiple LNAs, as described in reference to the other figures. In some embodiments, circuit die 226 includes two circuit dice, each attached to a BGA. In such an embodiment, one of the two circuit dies may include the programmable switch network and the other may include multiple LNAs. In some specific embodiments, input pins RX1-RX12 may be coupled to an antenna switch or to filters that are coupled to an antenna switch. Further, output pins A0-A2 may be coupled to an application processor. In other embodiments, circuit die 226 does not include LNAs and output pins A0-A2 may be coupled to LNAs separate from component 220.

According to various embodiments, the arrangement of input pins and output pins may be configured on different sides of component 220. For example, all the input pins may be arranged on one side (not shown) and all the output pins may be arranged on another side. In a another embodiment, all the input pins RX1-RX12 are arranged on three sides of component 220 and all the output pins A0-A2 may be arranged on a fourth side of component 220. The number of input pins and the number of output pins may each be any number in various embodiments. For example, one embodiment includes a single output pin A0 and 8 input pins RX1-RX8.

Figure 9:
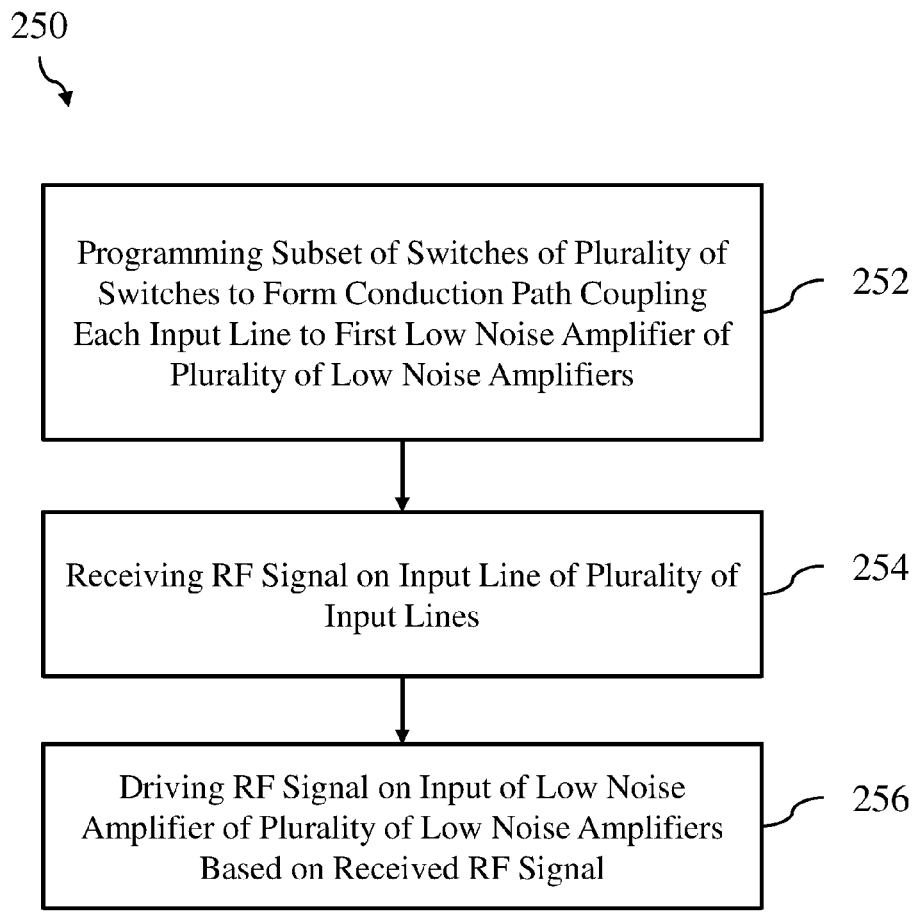
FIG. 9 illustrates a method of operation of embodiment systems.

FIG. 9 illustrates a method of operation 250 for embodiment switch components including steps 252, 254, and 256. According to various embodiments, a switch component includes multiple input lines coupled to multiple low noise amplifiers (LNAs) through multiple switches coupled between the input lines and the LNAs. Each input line is coupled to each of the LNAs through one of the switches. Step 252 of method of operation 250 includes programming a subset of the switches to each form a conduction path coupling each input line to one of the LNAs. Step 254 includes receiving an RF signal at an input line and step 256 includes driving an RF signal at an input of an LNA based on the received RF signal.

According to the various embodiments described herein, a switch component or network may be coupled to the outputs of the LNAs as well. In such embodiments, the output pin-out may be further programmed in addition to the input pin-out using switch networks as described herein in reference to the figures.

According to various embodiments, a circuit package includes a programmable switch component including a plurality of input terminals arranged on the programmable switch component, a plurality of output terminals arranged on the programmable switch component and configured to be coupled to a plurality of amplifiers, and a plurality of switches. Each switch of the plurality of switches is coupled between an input terminal of the plurality of input terminals and an output terminal of the plurality output terminals. Each switch of the plurality of switches includes a radio frequency (RF) switch and is configured to pass an RF signal when closed. Each input terminal of the plurality of input terminals is coupled to two switches of the plurality of switches.

In various embodiments, the plurality of switches includes single switches coupled between each input terminal of the plurality of input terminals and every output terminal of the plurality of output terminals. The plurality of switches may include digitally programmable switches. In some embodiments, the plurality of switches includes physically programmable switches including laser fuse switches or efuse switches.

In various embodiments, the circuit package includes a plurality of low noise amplifiers coupled to each output terminal of the plurality of output terminals of the switch component. The programmable switch component and the plurality of low noise amplifiers may be packaged together on a single chip. The single chip may be attached to a printed circuit board. In other embodiments, the programmable switch component and the plurality of low noise amplifiers are attached to a printed circuit board. Each of the plurality of switches may include a CMOS switch and each of the plurality of low noise amplifiers may include a silicon-germanium amplifier or a gallium-arsenide amplifier.

In various embodiments, the plurality of input terminals are arranged on a first side of the programmable switch component and the plurality of output terminals are arranged on a second side of the programmable switch component. The first side is different from the second side. In some embodiments, the plurality of input terminals is greater in number than the plurality of output terminals. The circuit package may include a single low noise amplifier coupled to each output terminal of the plurality of output terminals of the switch component.

In various embodiments, the circuit package also includes a low-band low noise amplifier coupled to a first subset of the plurality of output terminals and a mid-band low noise amplifier coupled to a second subset of the plurality of output terminals. In such embodiments, the circuit package may also include a high-band low noise amplifier coupled to a third subset of the plurality of output terminals. Outputs of the low-band low noise amplifier, the mid-band low noise amplifier, and the high-band low noise amplifier may be multiplexed together and supply a single output of the circuit package.

According to various embodiments, a wireless communications device includes a printed circuit board (PCB), a switch component attached to the PCB, a plurality of low noise amplifiers attached to the PCB, and a filter coupled to an input of the plurality of inputs of the switch component. Each low noise amplifier of the plurality of low noise amplifiers is coupled to an output of the plurality of outputs of the switch component. The switch component includes a plurality of inputs, a plurality of outputs, and a plurality of switches coupled between each input of the plurality of inputs and two outputs of the plurality of outputs of the switch component. In such embodiments, each respective switch of the plurality of switches is selectively programmed to couple or uncouple an input to an output.

In various embodiments, the plurality of switches includes switches coupled between each individual input of the plurality of inputs and every output of the plurality of outputs. In some embodiments, a subset of outputs of the plurality of low noise amplifiers are coupled together at an output line. The wireless communications device may also include an application processor attached to the PCB. In such embodiments, the output line is coupled to the application processor through a coaxial cable. In some embodiments, every output of the plurality of low noise amplifiers may be coupled together at the output line.

In various embodiments, the wireless communications device also includes a plurality of filters. Each input of the plurality of inputs of the switch component is coupled to a filter of the plurality of filters. The plurality of low noise amplifiers may include a low-band low noise amplifier, a mid-band low noise amplifier, and a high-band low noise amplifier. In some embodiments, the plurality of low noise amplifiers includes only a low-band low noise amplifier and a mid-band low noise amplifier. The wireless communications may also include an amplifier package attached to the PCB. The amplifier package includes the switch component and the plurality of low noise amplifiers. In some embodiments, the plurality of inputs are arranged on a first side of the switch component and the plurality of outputs are arranged on an additional side of the switch component. The first side may include a first, second, and third side and the additional side may include a fourth side.

According to various embodiments, a method of operating a switch component is disclosed. The switch component includes a plurality of input lines coupled to a plurality of low noise amplifiers through a plurality of switches coupled between the plurality of input lines and the plurality of low noise amplifiers. Each input line of the plurality of input lines is coupled to each low noise amplifier of the plurality of low noise amplifiers through a switch of the plurality of switches. The method includes programming a subset of switches of the plurality of switches to form a conduction path coupling each input line to a first low noise amplifier of the plurality of low noise amplifiers, receiving a radio frequency (RF) signal at an input line of the plurality of input lines, and driving an RF signal at an input of a low noise amplifier of the plurality of low noise amplifiers based on the received RF signal. In such embodiments, the RF signal is driven through the conduction path.

In various embodiments, programming the subset of switches includes programming the subset of switches of the plurality of switches to form conduction paths coupling a first subset of input lines to the first low noise amplifier of the plurality of low noise amplifiers and a second subset of input lines to a second low noise amplifier of the plurality of low noise amplifiers. The first subset of input lines and the second subset of input lines each may include a plurality of input lines. Programming the subset of switches may include physically writing fuses. In some embodiments, the method of also includes simultaneously receiving a plurality of RF signals at a subset of the plurality of input lines and driving an aggregate RF signal at the input of the low noise amplifier of the plurality of low noise amplifiers based on the plurality of RF signals simultaneously received at the subset of the plurality of input lines.

Advantages of various embodiments may include simple coupling between wireless signal lines and LNAs, decreased redesign, decreased layout time, decreased unique pin-out generation, increased flexibility of products, and easily interchangeable switch networks that may be placed in different systems without modification.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A device comprising:
    a programmable switch component comprising:
        a plurality of input pins arranged on the programmable switch component and externally accessible from outside the programmable switch component, each input pin of the plurality of input pins configured to receive signals in different bands from each other;
        a plurality of output terminals arranged on the programmable switch component and configured to be coupled to a plurality of amplifiers; and
        a plurality of switches, wherein:
            each switch of the plurality of switches is coupled between an input pin of the plurality of input pins and an output terminal of the plurality of output terminals;
            each switch of the plurality of switches comprises a radio frequency (RF) switch and is configured to pass an RF signal when closed;
            each input pin of the plurality of input pins is coupled to at least two output terminals of the plurality of output terminals through one or more switches of the plurality of switches; and
            each switch of the plurality of switches is directly connected to an input pin of the plurality of input pins.

2. The device of claim 1, wherein the plurality of switches comprises digitally programmable switches.

3. The device of claim 1, wherein the plurality of switches comprises physically programmable switches comprising laser fuse switches or efuse switches.

4. The device of claim 1, further comprising a plurality of low noise amplifiers.

5. The device of claim 4, wherein the programmable switch component and the plurality of low noise amplifiers are packaged together on a single chip.

6. The device of claim 4, wherein the programmable switch component and the plurality of low noise amplifiers are separately attached to a printed circuit board, and wherein:
    the plurality of output terminals of the programmable switch component are externally accessible from outside the programmable switch component; and
    each low noise amplifier of the plurality of low noise amplifiers is coupled to a separate output terminal of the plurality of output terminals of the programmable switch component.

7. The device of claim 4, wherein each of the plurality of switches comprises a CMOS switch and each of the plurality of low noise amplifiers comprises a silicon-germanium amplifier or a gallium-arsenide amplifier.

8. The device of claim 4, wherein the plurality of low noise amplifiers includes:
   a low-band low noise amplifier coupled to a first subset of the plurality of output terminals;
   a mid-band low noise amplifier coupled to a second subset of the plurality of output terminals; and
   a high-band low noise amplifier coupled to a third subset of the plurality of output terminals.

9. The device of claim 8, wherein outputs of the low-band low noise amplifier, the mid-band low noise amplifier, and the high-band low noise amplifier are multiplexed together and supply a single output of the device.

10. The device of claim 1, wherein the plurality of input pins are arranged on a first external side of the programmable switch component and the plurality of output terminals are arranged on a second external side of the programmable switch component, the first external side different from the second external side.

11. The device of claim 1, wherein the plurality of input pins is greater in number than the plurality of output terminals.

12. The device of claim 1, further comprising a single low noise amplifier coupled to each output terminal of the plurality of output terminals of the programmable switch component.

13. The device of claim 1, wherein the RF signal comprises a frequency above 700 MHz.

14. The device of claim 1, wherein the plurality of input pins comprises a ball grid array (BGA).

15. A system comprising:
   a printed circuit board (PCB);
   a switch component attached to the PCB, the switch component comprising:
      a plurality of input pins externally accessible at the PCB,
      a plurality of outputs, and
      a plurality of switches coupled between each input pin of the plurality of input pins and two outputs of the plurality of outputs of the switch component, wherein each respective switch of the plurality of switches is selectively programmed to couple or uncouple an input pin to an output, and wherein each respective switch of the plurality of switches is directly connected to an input pin of the plurality of input pins;
   a plurality of low noise amplifiers attached to the PCB, wherein each low noise amplifier of the plurality of low noise amplifiers is coupled to an output of the plurality of outputs of the switch component, wherein each of the plurality of low noise amplifiers operates in different frequency bands, wherein each of the plurality of low noise amplifiers is directly coupled to a separate output of the plurality of outputs of the switch component; and
   a filter coupled to an input pin of the plurality of input pins of the switch component.

16. The system of claim 15, wherein a subset of outputs of the plurality of low noise amplifiers is coupled together at an output line.

17. The system of claim 16, further comprising an application processor attached to the PCB, wherein the output line is coupled to the application processor through a coaxial cable.

18. The system of claim 17, wherein every output of the plurality of low noise amplifiers is coupled together at the output line.

19. The system of claim 15, further comprising a plurality of filters, wherein each input pin of the plurality of input pins of the switch component is coupled to a filter of the plurality of filters.

20. The system of claim 15, wherein the plurality of low noise amplifiers comprises a low-band low noise amplifier, a mid-band low noise amplifier, and a high-band low noise amplifier.

21. The system of claim 15, wherein the plurality of low noise amplifiers includes a low-band low noise amplifier and a mid-band low noise amplifier.

22. The system of claim 15, further comprising an amplifier package attached to the PCB, wherein the amplifier package comprises the switch component and the plurality of low noise amplifiers.

23. The system of claim 15, wherein the plurality of input pins are arranged on a first external side of the switch component and the plurality of outputs are arranged on an additional external side of the switch component.

24. The system of claim 23, wherein the external first side comprises a first, second, and third side and the additional external side comprises a fourth side.

25. The system of claim 15, wherein the plurality of switches are configured to conduct RF signals comprising frequencies above 700 MHz.

26. The system of claim 15, wherein the plurality of input pins comprises a ball grid array (BGA).

27. A method of operating a switch component comprising a plurality of input pins coupled to a plurality of low noise amplifiers through a plurality of switches coupled between the plurality of input pins and the plurality of low noise amplifiers, each input pin of the plurality of input pins coupled to each low noise amplifier of the plurality of low noise amplifiers through a switch of the plurality of switches, the method comprising:
   programming a subset of switches of the plurality of switches to form a conduction path coupling each input pin to a first low noise amplifier of the plurality of low noise amplifiers, wherein the plurality of input pins are externally accessible from outside the switch component, wherein each of the plurality of low noise amplifiers operates in different frequency bands;
   receiving a radio frequency (RF) signal at an input pin of the plurality of input pins; and
   driving an RF signal at an input of a low noise amplifier of the plurality of low noise amplifiers based on the received RF signal, wherein the RF signal is driven through the conduction path and the RF signal includes frequencies above 700 MHz.

28. The method of claim 27, wherein programming the subset of switches comprises programming the subset of switches of the plurality of switches to form conduction paths coupling a first subset of input pins of the plurality of input pins to the first low noise amplifier of the plurality of low noise amplifiers and a second subset of input pins of the plurality of input pins to a second low noise amplifier of the plurality of low noise amplifiers.

29. The method of claim 28, wherein the first subset of input pins and the second subset of input pins each comprises a plurality of input pins.

30. The method of claim 29, wherein programming the subset of switches comprises physically writing fuses.

31. The method of claim 27, wherein:
the receiving a radio frequency (RF) signal at an input pin of the plurality of input pins comprises simultaneously receiving a plurality of RF signals at a subset of the plurality of input pins, each of the plurality of RF signals being signals in different bands; and
the driving an RF signal at an input of a low noise amplifier of the plurality of low noise amplifiers based on the received RF signal comprises driving an aggregate RF signal at an input of a low noise amplifier of the plurality of low noise amplifiers based on the plurality of RF signals simultaneously received at the subset of the plurality of input pins.

32. The method of claim 27, wherein programming the subset of switches of the plurality of switches further comprises setting a remainder of switches of the plurality of switches that are not in the subset of switches of the plurality of switches in a non-conductive state.

33. The method of claim 27, wherein the RF signal is driven through the conduction path and the RF signal includes frequencies above 700 MHz.

\* \* \* \* \*

UNITED STATES PATENT AND TRADEMARK OFFICE
CERTIFICATE OF CORRECTION

PATENT NO. : 9,941,909 B2
APPLICATION NO. : 15/241736
DATED : April 10, 2018
INVENTOR(S) : Daniel Kehrer Page 1 of 1

It is certified that error appears in the above-identified patent and that said Letters Patent is hereby corrected as shown below:

On the Title Page

Item (54), Line 2, delete "NETWORKS" and insert --NETWORK--.

Signed and Sealed this
Fourteenth Day of August, 2018

Andrei Iancu
*Director of the United States Patent and Trademark Office*